(12) United States Patent
Spazio

(10) Patent No.: US 11,788,452 B2
(45) Date of Patent: Oct. 17, 2023

(54) TANK FOR A LIQUID SOLUTION

(71) Applicant: CARRARO S.P.A., Campodarsego-Padova (IT)

(72) Inventor: Andrea Spazio, Rovigo (IT)

(73) Assignee: CARRARO S.P.A., Campodarsego-Padova (IT)

( * ) Notice: Subject to any disclaimer, the term of this patent is extended or adjusted under 35 U.S.C. 154(b) by 0 days.

(21) Appl. No.: 17/560,538

(22) Filed: Dec. 23, 2021

(65) Prior Publication Data
US 2022/0205379 A1 Jun. 30, 2022

(51) Int. Cl.
*F01N 3/20* (2006.01)

(52) U.S. Cl.
CPC ............ *F01N 3/2066* (2013.01); *F01N 3/206* (2013.01); *F01N 3/208* (2013.01); *F01N 2610/02* (2013.01); *F01N 2610/10* (2013.01); *F01N 2610/14* (2013.01); *F01N 2610/142* (2013.01); *F01N 2610/1406* (2013.01); *F01N 2610/1413* (2013.01); *F01N 2610/1426* (2013.01); *F01N 2610/1466* (2013.01); *F01N 2610/1473* (2013.01); *F01N 2610/1486* (2013.01); *F01N 2900/1811* (2013.01); *F01N 2900/1814* (2013.01)

(58) Field of Classification Search
CPC combination set(s) only.
See application file for complete search history.

(56) References Cited

U.S. PATENT DOCUMENTS

| | | | |
|---|---|---|---|
| 11,345,514 B2 * | 5/2022 | Moon | B65D 25/56 |
| 2015/0089996 A1 * | 4/2015 | Reimer | G01N 29/02 73/19.1 |
| 2015/0167529 A1 * | 6/2015 | Lee | B60K 15/01 60/295 |
| 2017/0184000 A1 * | 6/2017 | Kou | B60K 13/04 |
| 2018/0111820 A1 * | 4/2018 | Ham | B67D 7/3281 |
| 2018/0306145 A1 * | 10/2018 | Inami | F02M 37/0082 |
| 2020/0156464 A1 * | 5/2020 | Nimrichter | B60K 15/035 |
| 2021/0010406 A1 * | 1/2021 | Swaroop | B01D 35/18 |

FOREIGN PATENT DOCUMENTS

| | | |
|---|---|---|
| DE | 102014108088 A1 | 12/2015 |
| JP | 2004285961 A * | 10/2004 |
| KR | 20150087442 A | 7/2015 |
| KR | 102042360 B1 | 11/2019 |

* cited by examiner

*Primary Examiner* — Binh Q Tran
(74) *Attorney, Agent, or Firm* — Volpe Koenig

(57) ABSTRACT

Tank for a liquid solution based on water and urea which is suitable for being combined with a selective catalytic reduction system. The tank comprises: a container including an upper wall; a filling pipe union which is positioned on the upper wall of the container and which is suitable for introducing the liquid solution; a lower opening, from which the liquid solution being introduced passes into the container and which protrudes with respect to the upper wall towards the interior of the container; a closure float which is positioned in the container and which is connected to the lower opening and which is configured so as to raise and close the lower opening once the liquid solution in the container reaches a predetermined level.

13 Claims, 2 Drawing Sheets

TANK FOR A LIQUID SOLUTION

INVENTIVE FIELD

The invention relates to a tank for a liquid solution particularly suitable for being combined with a selective catalytic reduction system. Selective catalytic reduction (SCR) is a chemical process for reducing nitrogen oxides (NOx) in the exhaust gases. The SCR systems are used in both industry and diesel vehicles, such as motor vehicles, agricultural vehicles, construction vehicles, etcetera.

BACKGROUND

In diesel vehicles, it is necessary to use after-treatment of the exhaust gases by means of the SCR system in order to be included within the Nox emission limits provided for by regulations.

The liquid solution is based on water, preferably deionized water, and urea [$CO(NH_2)_2$], and is used as a reducing chemical agent. The liquid solution can also be identified in a specific product called AdBlue® or DEF (Diesel Exhaust Fluid), which is constituted by approximately 32.5% urea and 67.5% water.

Typically, an SCR system which is installed in a diesel vehicle comprises an SCR tank, an electronic control unit (in some cases, the system is controlled by a suitable SCR control unit while, in other vehicles, these functions are carried out by an engine control unit), a supply pump, an injector, a reducing catalyst, a Nox probe with a relevant control unit and a temperature sensor.

The reducing liquid solution is contained in a suitable tank. A supply pump, which is electronically controlled by the SCR control unit (or by the engine control unit), pressurizes the liquid solution inside the SCR circuit. According to the quantity of diesel oil injected, the SCR control unit (or engine control unit) will control a suitable injection of liquid solution upstream of the reducing catalyst.

Therefore, the selective catalytic reduction system installed in diesel vehicles comprises a tank which is suitable for containing the liquid solution based on water and urea. This tank may be called the "SCR tank" or simply "tank".

The Applicant has initially observed that a typical problem of such tank types involves the liquid solution freezing below a specific temperature. When the liquid solution freezes, it increases in volume and this may lead to damage to the tank. For this reason, it is necessary to fill the tank to a level lower than the maximum permitted level.

One possible method for filling the tank which prevents its complete filling may be the method of positioning the pipe union in a lower position with respect to the top of the tank in such a manner that it overflows when the maximum level is reached, ensuring the presence of the necessary empty space.

The Applicant has observed that this type of positioning of the pipe union cannot always be carried out because it is linked to the position of the tank and to the construction constraints of the vehicle.

SUMMARY

Therefore, the problem addressed by the present invention is to provide a tank for a liquid solution which is structurally and functionally configured to at least partially overcome one or more of the disadvantages set out with reference to the cited prior art.

Another object of the invention is to provide a tank for a liquid solution which may be particularly versatile in terms of use while maintaining a generally simple structure.

This problem is solved and this object is achieved by the invention by means of a tank for a liquid solution constructed according to the appended claims.

It will be appreciated that, according to the present invention, the tank for a liquid solution based on water and urea is advantageously combined with a selective catalytic reduction system and comprises: a container including an upper wall; a filling pipe union which is positioned on the upper wall of the container and which is suitable for introducing the liquid solution; a lower opening, from which the liquid solution being introduced passes into the container, which protrudes with respect to the upper wall towards the interior of the container; a closure float which is positioned in the container and which is connected to the lower opening and which is configured so as to raise and close the lower opening once the liquid solution in the container reaches a predetermined level. Advantageously, this predetermined level substantially corresponds to the level at the lower opening. In other words, the lower opening is positioned lower than the upper wall of the container. It will be appreciated that, in the context of the present invention, the term "lower" indicates a lower position with respect to the vertical direction defined by gravitational force.

Preferably, the filling pipe union includes a member having an elongate shape and having an end at which the lower opening is formed. Advantageously, this end protrudes with respect to the upper wall towards the interior of the container.

In a preferred embodiment of the invention, the tank comprises a central pipe which is positioned inside the filling pipe union and which comprises a central member having an elongate shape and having a protruding end with respect to the upper wall towards the interior of the container, wherein the lower opening is formed at this end. This solution has the advantage of being able to be carried out more easily because it provides for the insertion of an additional pipe in order to prevent the pipe union from being structurally modified.

In an alternative embodiment, the filling pipe union may advantageously not be provided with the central pipe. In this case, the lower opening is preferably formed at one end of the pipe union. Advantageously, the end is the one which is located at the tank.

Preferably, the closure float comprises an upper surface which includes a closure element which is suitable for closing the lower opening. Advantageously, the closure element protrudes from the upper surface towards the lower opening.

Advantageously, the closure element has a convex shape, preferably a hemispherical shape, and faces the lower opening. Once the liquid solution in the container reaches the predetermined level, the float which is urged upwards during the filling of the container comes into contact with the lower opening by means of the closure element thereof. The convex shape, advantageously hemispherical shape, allows the closure element to conform to the shape of the lower opening in a particularly effective manner. This allows closure of the opening to be obtained without leaks of liquid solution occurring.

The closure element is preferably positioned in a recess, which is preferably cylindrical and which is formed in the upper surface of the closure float. Advantageously, when the closure element of the float is in contact with the lower opening, the end of the central member of the central pipe can be received in the recess of the float. By positioning the closure element in the recess, it is possible to obtain a float having a limited extent in a closure direction. The term "closure direction" is advantageously intended to be understood to be the direction in which the float moves when it is moved by the liquid solution which is introduced into the container. By limiting the extent, it is possible to obtain a float of substantially flat shape which allows the float to be used in containers having a limited vertical extent.

The tank to which the invention relates prevents the complete filling of the container, thereby preventing damage to the tank itself in the case of freezing of the liquid solution and consequent expansion thereof.

BRIEF DESCRIPTION OF THE DRAWINGS

The features and advantages of the invention will be better understood from the detailed description of an embodiment thereof which is illustrated by way of non-limiting example with reference to the appended drawings, in which.

DETAILED DESCRIPTION OF THE PREFERRED EMBODIMENTS

Figure 1:
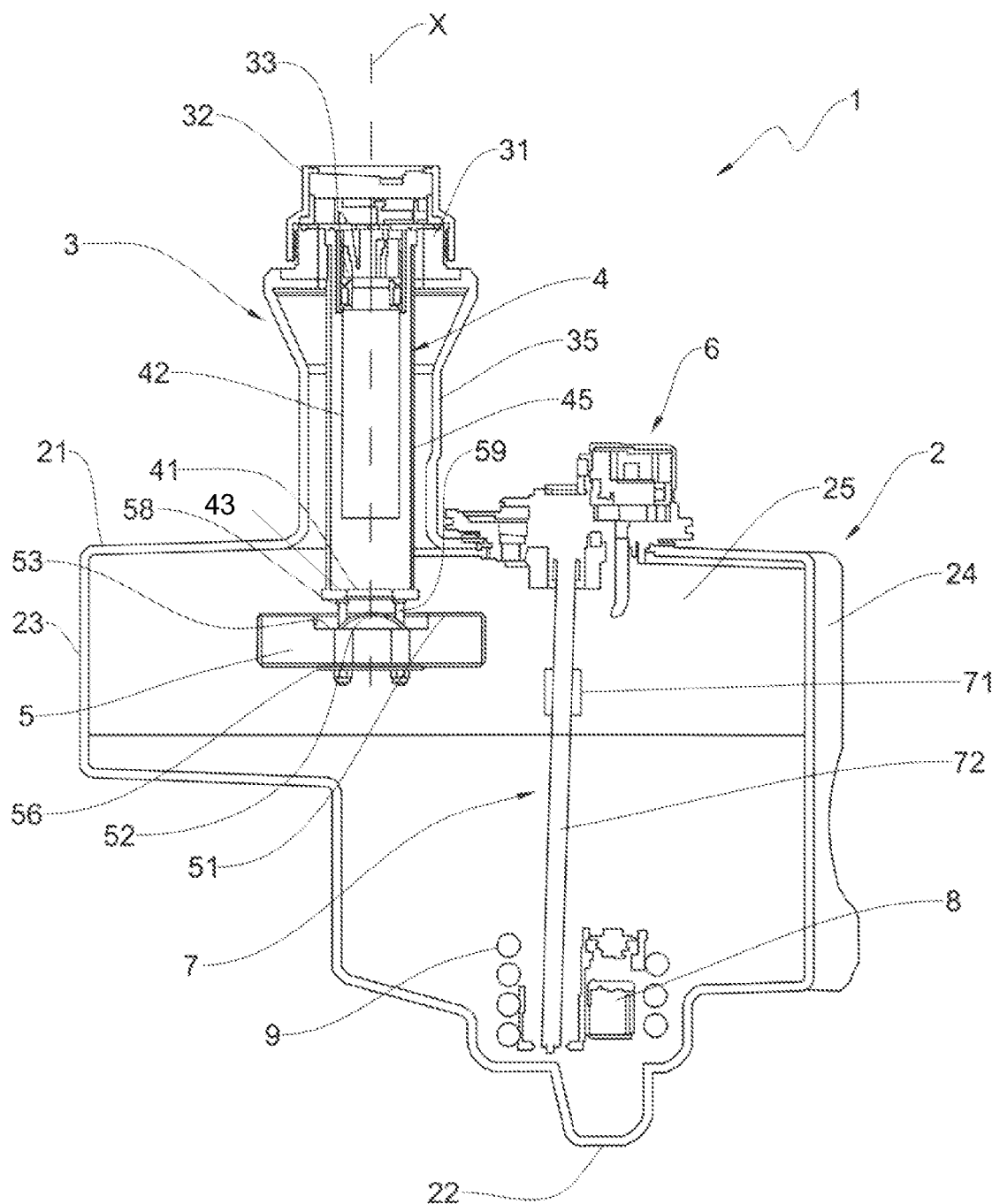
FIG. 1 is a cross-section of the tank according to the invention in a condition in which the level of solution present inside the container is such that the float leaves the lower opening open.

In the Figures, a tank for liquid solution is generally designated 1. Preferably, the tank 1 is mounted on a diesel vehicle in a position which is easily accessible from the exterior so as to promote the refilling of liquid solution.

The materials from which the tank is composed are preferably stainless steel, an aluminium/magnesium alloy or medium to high-density propylene. The tank 1 for a liquid solution comprises a container 2 which advantageously has an approximately box-shaped form.

Preferably, the volume of the container 2 is equal to at least 25% of the volume of a tank for diesel which is present in the vehicle. Advantageously, the container 2 is made of opaque material.

According to an aspect of the invention, the container 2 may become deformed so that the expansion volume is at least equal to 10% of the total volume.

The container 2 comprises an upper wall 21. Preferably, the container 2 includes a lower wall 22, a left wall 23, a right wall 24, a rear wall 25 and a front wall (not illustrated). The container 2 may advantageously contain several tens of litres of liquid solution.

In the embodiment illustrated, the lower wall 22 and the left wall 23 have an irregular shape, comprising a recess and a protuberance, respectively. The shape of the container 2 advantageously varies on the basis of the dimensions and the availability of space of the vehicle in which it will be received. Therefore, the container 2 may have a different shape in other embodiments.

The liquid solution is based on water, preferably deionized water, and urea [CO(NH2)2]. The liquid solution can also be advantageously identified in a specific product called AdBlue® or DEF (Diesel Exhaust Fluid), which is constituted by approximately 32.5% urea and 67.5% water.

The operating temperatures of the liquid solution are preferably maintained in the range between 0° C. and 50° C.

The tank 1 for a liquid solution comprises a filling pipe union 3 which is suitable for introducing the liquid solution into the container 2. The filling pipe union 3 is preferably positioned on the upper wall 21 of the container 2. Advantageously, the pipe union has a member 35 with an elongate shape which extends about an axis X. The member 35 of the filling pipe union 3 has a shape which is advantageously cylindrical, even more advantageously cylindrical with a variable cross-section. In other embodiments, the shape of the member 35 could be elliptical, parallelogram-like, hexagonal, irregular, etcetera. Preferably, the shape and the dimensions of the filling pipe union 3 are such as to prevent the accidental introduction of a dispenser for diesel oil inside the container 2.

The filling pipe union 3 comprises an upper end 31. At this upper end 31, a threaded area is preferably formed which can be associated with a closure device 32. The closure device 32 may advantageously be a cap with an internal threaded section.

Preferably, the pipe union 3 comprises a magnetic device 33. Advantageously, the magnetic device 33 activates a solenoid valve which is positioned on a dispenser which controls the dispensing of the liquid solution inside the container 2. The object of the magnetic device is to prevent the liquid solution from being introduced into unsuitable containers. Preferably, the pipe union 3 is configured to prevent leaks of the liquid solution.

A central pipe 4 is preferably positioned inside the filling pipe union 3. Preferably, the central pipe 4 comprises a central member 45 which has an elongate shape and which extends about the axis X. Even more preferably, the central pipe 4 has a cylindrical shape. Advantageously, the filling pipe union 3 and the central pipe 4 extend about the same axis X. Preferably, the width of the central member 45 of the central pipe 4 is less than the width of the member 35 of the pipe union 3. Advantageously, the central member 45 comprises an end 43, at which the lower opening 41 is formed. Preferably, the end 43 protrudes with respect to the upper wall 21 towards the interior of the container 2.

In other embodiments which are not illustrated, the central member 45 of the central pipe 4 may have a width which substantially corresponds to the width of the member 35 of the pipe union 3. In a preferred embodiment, a filter 42 is positioned inside the filling pipe union 3, preferably inside the central pipe 4, if present. The filter 42 serves to prevent any solid contaminations from being introduced into the container 2 during filling.

A lower opening 41, which protrudes with respect to the upper wall 21 towards the interior of the container 22, is advantageously formed on the central pipe 4, in particular at the end 43 of the central member 45 thereof. In other words, the lower opening 41 is positioned lower with respect to the upper wall 21 of the container 2. It will be appreciated that, in the context of the present invention, the term "lower" indicates a lower position with respect to the vertical direction defined by gravitational force.

In an embodiment which is not illustrated, the lower opening 41 is formed at one end of the member 35 of the pipe union 3. This end may advantageously protrude with respect to the upper wall 21 towards the interior of the container 2.

The tank 1 for a liquid solution comprises a closure float 5 which is positioned in the container 2 so as to be raised and to close the lower opening 41 once the liquid solution in the container 2 reaches a predetermined level, wherein this predetermined level substantially corresponds to the level of the lower opening 41 of the central pipe 4. Advantageously, the float 5 slides in a closure direction, substantially parallel with the axis X. The predetermined level is kept below the upper wall 21 of the container 2, that is spaced apart in the direction of the internal volume of the container 2, in order to prevent the complete filling of the container 2 which, in the case of freezing of the liquid solution and consequent expansion thereof, would lead to damage to the tank 1.

The term "level" is intended to be understood to be the height reached by the liquid solution inside the container.

Figure 2:
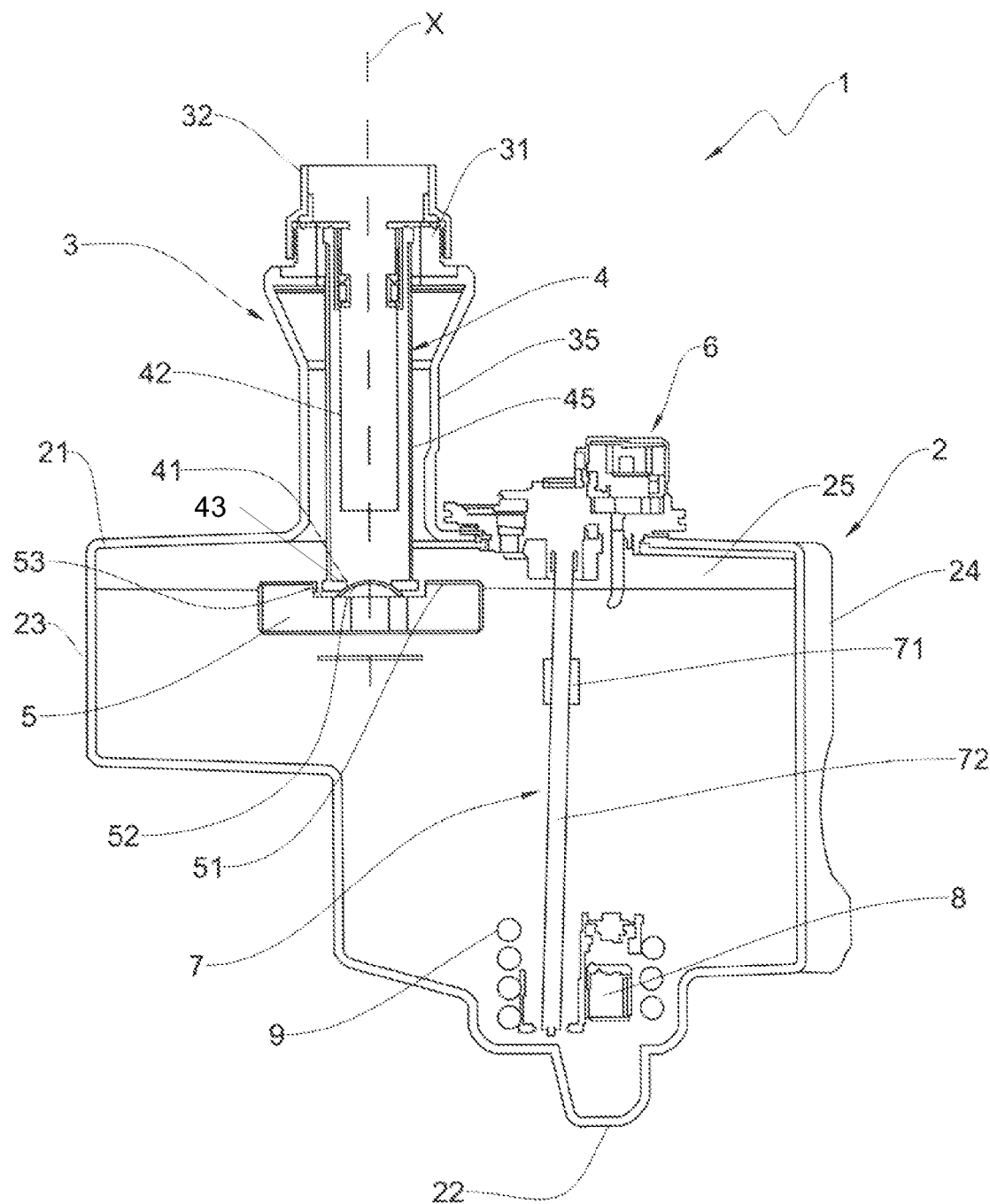
FIG. 2 is a cross-section of the tank according to the invention in a condition in which the level of solution present inside the container is such that the float closes the lower opening.

FIG. 2 illustrates the tank 1 in a condition in which the level present inside the container 2 has reached such a level that the float closes the lower opening 41 of the central pipe 4. Preferably, the closure float 5 has a disk-like shape. In other embodiments which are not illustrated, the float may have different shapes, for example, parallelepipedal, spherical, irregular, etcetera.

Advantageously, the closure float 5 has an upper surface 51 which includes a closure element 52 suitable for closing the lower opening 31 of the central pipe 4.

The closure element 52 preferably faces the lower opening 41. Advantageously, the closure element 52 is positioned in a recess 53 which is preferably cylindrical and which is formed in the upper surface 51 of the closure float 5. Preferably, the closure element 52 has a convex shape, even more preferably a hemispherical shape. Advantageously, the hemispherical shape has a diameter greater than the diameter of the lower opening 41 so that the closure element 52 can completely cover the lower opening 41.

In the embodiment depicted, there is formed in the upper surface 51 of the closure float 5 a recess 53 which is advantageously cylindrical and which has a diameter which is slightly greater than the diameter of the central pipe 4. The closure element 52 is provided in this cylindrical recess 53. Advantageously, when the closure element 52 of the float 5 is in contact with the lower opening 41, the end 43 of the central member 45 of the central pipe 4 may be received in the recess 53 of the float 5.

Preferably, the closure float 5 is slidingly connected to the central pipe 4. Advantageously, the closure float 5 is connected to the central pipe 4 by means of a sliding rod 58. Advantageously, the sliding rod 58 is connected to the closure float 5 by means of a threaded connection. Preferably the sliding rod 58 is received in through-openings which are formed in the float 5. The sliding rod 58 allows the closure float 5 to slide in accordance with the level of liquid solution present in the container 2, preferably from a lower opening position (FIG. 1) to an upper closure position (FIG. 2). Preferably, two sliding rods 58, 59 which are parallel with each other are present. Advantageously, a plate 56 which supports the float 5 when it is in the lower opening position is present between the two rods 58, 59.

In other embodiments which are not illustrated, the closure float 5 can be connected to the end of the member 35 of the pipe union 3, at which the lower opening 41 is formed. Alternatively, the closure float 5 can be connected to a wall of the container 2, preferably the upper wall 21, for example, by means of a sliding rod.

Connecting the closure float 5 to the central pipe 4 is preferable to connecting the closure float 5 to a wall of the container 3 because it is more economical to carry out because it does not require any modification of the pipe union 3 or a wall of the container 2.

According to an aspect of the invention, the tank 1 comprises a vent 6 which is suitable for ventilating the tank 1. In fact, the tank 1 is advantageously ventilated unlike a tank for diesel which is pressurized. The ventilation vent 6 allows air which will replace the urea injected to be introduced.

According to another aspect of the invention, the tank 1 comprises a level sensor 7.

The level sensor 7 advantageously comprises a level float 71 and a sliding rod 72. The level float 71 slides on the sliding rod 72 and varies the height thereof in accordance with the level of the liquid solution present in the container. Preferably, the level sensor 7 sends information items concerning the level of the liquid solution in the tank 1 to an electronic control unit present in the vehicle. Advantageously, in accordance with the information items received the control unit controls the passage of hot water from the engine compartment of the vehicle by means of a switching valve.

According to another aspect of the invention, the tank 1 comprises a quality sensor 8.

The quality sensor 8 serves to monitor the quality level of the liquid solution. Preferably, the quality sensor 8 monitors the level of concentration of the liquid solution in the tank 1. Advantageously, the quality sensor 8 is configured to identify accidental operations involving diesel being introduced into the tank 1 of urea. Preferably, the quality sensor 8 is connected to an electronic control unit which is present in the vehicle and which evaluates whether the level of concentration of the liquid solution is within a predetermined permitted range.

In an advantageous embodiment, the tank 1 comprises a temperature sensor which measures the temperature of the liquid solution in the tank 1.

Preferably, the tank 1 comprises an electrical resistor 9. The electrical resistor 9 mainly serves to defrost the liquid solution in the event of freezing.

Advantageously, the electrical resistor 9 is positioned near the lower wall 2 of the container 2. In the embodiment illustrated, the electrical resistor 9 is helical and is positioned around the level sensor 7.

The electrical resistor 9 preferably operates in a thermostatic manner. Advantageously, the electrical resistor is connected to an electronic control unit which is present in the vehicle. Preferably, the electrical resistor 9 is positioned near the intake line.

According to an aspect of the invention, if the liquid solution freezes as a result of conditions of low external temperatures, the electrical resistor 9 is activated so that the liquid solution is available for use, preferably up to approximately −15° C. measured inside the container 2, within approximately 20 minutes from the vehicle being started so that the SRC system is capable of operating correctly.

Therefore, the invention solves the problem proposed, at the same time affording a plurality of advantages, preventing the complete filling of the container particularly thanks to the closure float and therefore preventing damage to the tank itself in the event of freezing of the liquid solution and its consequent expansion.

The invention claimed is:

1. A tank (1) for a liquid solution based on water and urea, configured to be combined with a selective catalytic reduction system, the tank comprising:
   a container (2) including an upper wall (21);
   a filling pipe union (3) which is positioned on the upper wall (21) of the container (2) and which is configured to introduce the liquid solution;
   a lower opening (41), from which the liquid solution being introduced passes into the container (2) and which protrudes with respect to the upper wall (21) towards the interior of the container (2);

a central pipe (4) which is positioned inside the filling pipe union (3) and which comprises a central member (45) having an elongate shape and having an end (43) at which the lower opening (41) is formed; and a closure float (5) which is positioned in the container (2) and which is connected to the lower opening (41) and which is configured so as to raise and close the lower opening (41) once the liquid solution in the container (2) reaches a predetermined level.

2. The tank (1) for a liquid solution according to claim 1, wherein the filling pipe union (3) comprises a member (35) having an elongate shape and having an end at which the lower opening (41) is formed.

3. The tank (1) for a liquid solution according to claim 1, wherein the member (35) of the pipe union (3) and the central member (45) of the central pipe (4) extend about the same axis (X).

4. The tank (1) for a liquid solution according to claim 1, wherein the closure float (5) is in sliding connection with the central pipe (4), by means of a sliding rod (58).

5. The tank (1) for a liquid solution according to claim 1, wherein the closure float (5) comprises an upper surface (51) which comprising a closure element (52) which is configured to close the lower opening (41).

6. The tank (1) for a liquid solution according to claim 5, wherein the closure element (52) has a convex shape, or a hemispherical shape, and faces the lower opening (41).

7. The tank (1) for a liquid solution according to claim 5, wherein the closure element (52) is positioned in a recess (53), which is cylindrical and which is formed in the upper surface (51) of the closure float (5).

8. The tank (1) for a liquid solution according to claim 1, further comprising a filter (42) which is positioned inside the filling pipe union (3).

9. The tank (1) for a liquid solution according to claim 1, further comprising a vent (6) which is suitable for the ventilation of the tank (1).

10. The tank (1) for a liquid solution according to claim 1, further comprising a level sensor (7) which includes a level float (71) and a sliding rod (72).

11. The tank (1) for a liquid solution according to claim 1, further comprising a quality sensor (8) configured to monitor the quality level of the liquid solution in the tank (1).

12. The tank (1) for a liquid solution according to claim 1, further comprising a temperature sensor configured to measure the temperature of the liquid solution in the tank (1).

13. The tank (1) for a liquid solution according to claim 1, further comprising an electrical resistor (9) configured to defrost the liquid solution in the tank (1).

\* \* \* \* \*